No. 770,611. PATENTED SEPT. 20, 1904.
C. S. SCOTT.
DETACHABLE PNEUMATIC TIRE.
APPLICATION FILED JUNE 15, 1904.
NO MODEL.
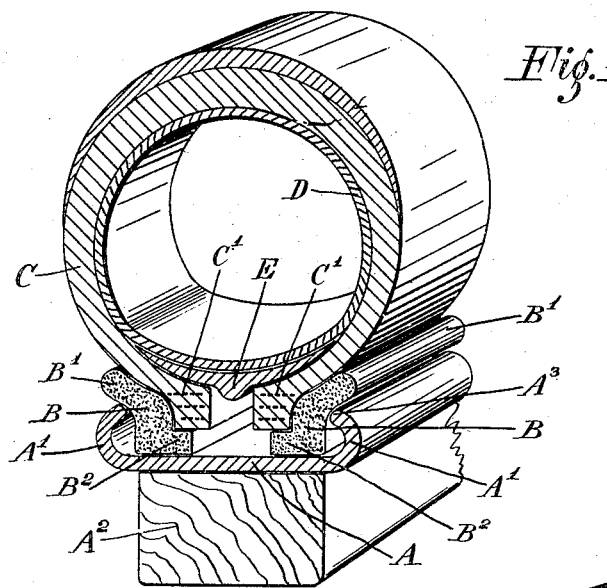
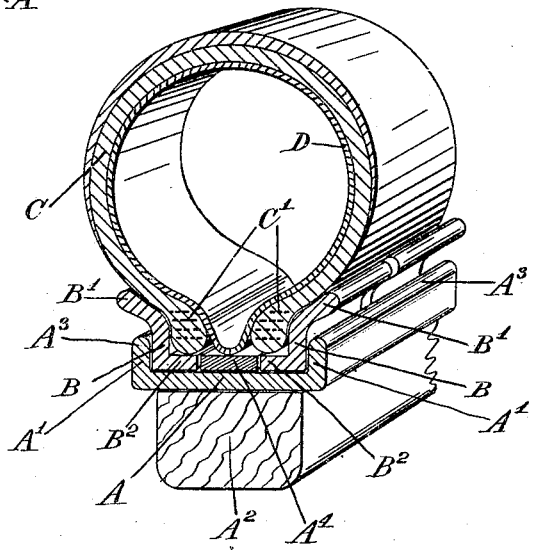
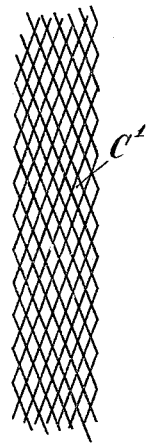
Witnesses:
Ivan Konigsberg
F. T. Chapman
Charles S. Scott, Inventor,
By his Attorneys,
Lyons & Bissing No. 770,611. Patented September 20, 1904.

UNITED STATES PATENT OFFICE.

CHARLES S. SCOTT, OF CADIZ, OHIO.

DETACHABLE PNEUMATIC TIRE.

SPECIFICATION forming part of Letters Patent No. 770,611, dated September 20, 1904.

Application filed June 15, 1904. Serial No. 212,699. (No model.)

*To all whom it may concern:*

Be it known that I, CHARLES S. SCOTT, a citizen of the United States, and a resident of Cadiz, Harrison county, Ohio, have invented a new and useful Improvement in Detachable Pneumatic Automobile-Tires, of which the following is a specification.

My invention relates to detachable pneumatic automobile as distinguished from bicycle tires, and while the principles of these two devices might seem the same practice has shown them to be quite different.

A construction which constitutes a rapidly and easily detachable pneumatic bicycle-tire is quite unsuited for the much heavier and thicker automobile-tire. Nevertheless the construction of tires originally invented for bicycles are today largely used for automobile purposes, with the result that the most widely used of automobile-tire as built today being of the clencher type cannot be taken off the wheel-rim without the aid of a pair of stout iron levers. The reason for this is that whereas it is readily possible to bend and distort the comparatively light fabric of which the shoes or covers of pneumatic bicycle-tires are composed, so as to get them on and off their coöperating wheel-rims, such necessary distortion in the case of automobile-tires cannot be done by hand and requires the assistance of heavy levers, the exertion of considerable force, and the expenditure of long patience, for automobile-tires must carry great weights and be blown up to high pressures. They must therefore be built of many layers of canvas and a heavy covering of rubber, making them almost as inflexible as a board. It is manifest, therefore, that if a detachable pneumatic tire for automobiles is to be constructed so as to be removable from the wheel-rim by the unassisted hands of the operator it means that the outer shoe must be capable of detachment without bending or distorting its shape, at least to any appreciable extent. Such a tire is produced by my invention.

In the drawings, Figure 1 is a cross-sectional perspective of one form of my tire. Fig. 2 is a cross-sectional perspective of another form, and Fig. 3 shows the woven-wire tape.

As my invention is applicable to the ordinary forms of wheel-rims now on the market, I have shown it in Fig. 1 applied to the well-known type of rim used with the clencher-tires. The metal rim A, with its rim-flange A', is firmly secured to the wood felly $A^2$ in the usual manner. Coöperating with the metal rim is an auxiliary annular rim-flange B, composed of rubber or other semi-elastic fabric molded into angular shape in cross-section, having a lip B' and a foot $B^2$. The selvage of the tire-shoe C is made partially or semi-inextensible, preferably by incorporating therein one or more lengths of woven-wire tape C' of the kind shown in Fig. 3. The usual inner tube D is employed, and there is a protection-strip E for the inner tube bridging the space between the selvages of the outer shoe.

Assuming now that the tire is deflated and it is desired to take the tire-shoe off the rim, it is merely necessary to push the right-hand selvage in Fig. 1 toward the left and to expand the auxiliary rim-flange B by pulling on it with the hand until it springs over the rim-flange A', whereupon the tire-shoe C can be pulled over the outer edge of the flange A' by hand. The inner tube D thus lies bare and can be gotten at for repair. The reason for this readiness and ease of operation will be largely found in the manner in which the removable auxiliary rim-flange and the semi-inextensible selvage in the tire-shoe coöperate. If the selvage were made completely inextensible, it would be found that its diameter would have to closely approximate the diameter of the outer edge $A^3$ of the rim-flange A'. Otherwise in inflating the tire the selvage would act against the lip B' of the auxiliary flange above the outer edge $A^3$, and unless the auxiliary flange B were made prohibitively heavy this would result in an unsteadiness of the parts and in a tendency to sheer off the upper edge B'; but if, on the contrary, such a completely inextensible edge should be made of less diameter than that of the outer edge $A^3$ then the shoe must be put into place on the rim by the well-known buttoning-over or Dunlap operation, which for such tires it is impossible to effect without the use of heavy tools and then not with satisfaction. My semi-inextensible edge in combination with the removable auxiliary rim-flange overcomes these difficulties. It has a fixed limit of stretch which prevents its extending over the outer edge of the auxiliary rim-flange and yet enough yield, so that it may be readily slipped over the rim-flange without any nice adjustment of diameters. In fact, in the construction shown in Fig. 1 I have incorporated several pieces of woven-wire tape C' in the selvages of the tire-shoe C, producing semi-extensible selvages along a number of diameters, some of which are a trifle larger and some smaller than the diameter of the outer edge $A^3$ of the rim flange A'. The semi-inextensible selvage as made, for instance, in the manner pointed out is also pliable. This pliability has the function of permitting a closer fit between the outer face of the tire-shoe and the inner face of the auxiliary flange B, which tends to prevent any chafing between these parts. In addition the pliability of the selvage is of great assistance in manipulating it to put it on or take it off the wheel-rim. Such pliability permits us to dispense with all tools and the like and allows heavy automobile-tires to be attached and detached by the use of the hands only.

In Fig. 2 I have shown another form of wheel-rim A, having a rim-flange A' and a filler $A^4$, secured to the rim A. The auxiliary rim-flange is composed of an annular split angle-iron B, having a foot $B^2$ and a lip B'. The tire-shoe C has its selvage made semi-extensible, preferably by incorporating therein one or more pieces of woven-wire fabric C'. When the inner tube D is inflated, the selvages C' may be pushed onto the filler $A^4$ and the angle-iron B be expanded by reason of the split and be sprung off the wheel-rim. The selvage of the tire-shoe may then readily be drawn over the outer edge $A^3$ of the rim-flange A', thus freeing the inner tube D.

An annular split angle-iron used as an auxiliary rim-flange is a peculiar utility. The selvage, which rests on the foot $B^2$ of the angle-iron, holds it in place on the rim and does away with the need of fastening devices for locking together the two edges on each side of the split or slot therein. Furthermore, the foot $B^2$ of this angle-iron lends considerable strength to its lip B'. This obviates the necessity of making the lip B' so heavy as to interfere with the ease of springing it open, so as to remove it over the rim-flange A'.

It is to be understood, of course, that, as is usual in this class of devices, the inner tube may be cemented to the outer shoe and that my invention may be applied with perfect efficiency to one side of the rim-flange only. It is also to be understood that my auxiliary rim-flange, practically speaking, extends the outer edge $A^3$ of the rim-flange A', this being due to the fact that the diameter of the outer edge $A^3$ of the rim-flange is less than the diameter of the outer edge of the auxiliary rim-flange and of course greater than the diameter of the under face of its foot $B^2$. It will furthermore be seen that the length of the semi-inextensible selvage when stretched is less than the circumference of the outer edge of the auxiliary flange B. I may take this stretched circumference to measure between the circumferences of the edges $A^3$ and the outer edge B'. While I speak of the "angle-iron" flange, this is to be understood as covering an angular flange of other metal.

I claim—

1. A detachable, pneumatic tire for automobiles comprising a rim-flange, an annular, expansible, auxiliary rim-flange extending its outer edge, and a tire-shoe having a pliable semi-inextensible selvage whose stretched circumference is less than that of the outer edge of the auxiliary flange, substantially as described.

2. A detachable pneumatic tire for automobiles comprising a rim-flange, an annular expansible, auxiliary rim-flange extending its outer edge, and a tire-shoe having a semi-inextensible selvage whose stretched circumference measures between those of the outer edges of these two flanges, substantially as described.

3. A detachable pneumatic tire for automobiles comprising a rim-flange, an annular auxiliary rim-flange of split angle-iron extending its outer edge, and a tire-shoe having a semi-inextensible selvage whose stretched circumference is less than that of the outer edge of the auxiliary flange, substantially as described.

4. A detachable pneumatic tire for automobiles comprising a wheel-rim having a central filler and a rim-flange, an annular, expansible, auxiliary rim-flange of split angle-iron extending its outer edge, and a tire-shoe having a semi-inextensible selvage whose stretched circumference measures less than that of the outer edge, substantially as described.

5. A detachable, pneumatic tire for automobiles comprising a rim-flange, an annular, expansible auxiliary rim-flange extending its outer edge, and a tire-shoe having woven-wire tape incorporated therein to constitute a pliable selvage whose stretched circumference is less than that of the outer edge of the auxiliary flange, substantially as described.

6. A detachable pneumatic tire for automobiles comprising a rim-flange, an annular auxiliary rim-flange of split angle-iron extending its outer edge, and a tire-shoe having woven-wire tape incorporated therein to constitute a pliable selvage whose stretched circumference is less than that of the outer edge of the auxiliary flange, substantially as described.

In testimony whereof I have signed my name to this specification in the presence of two subscribing witnesses.

CHAS. S. SCOTT.

Witnesses:
F. J. LESSNA,
W. S. CESSERA.